United States Patent Office 3,028,750
Patented Apr. 10, 1962

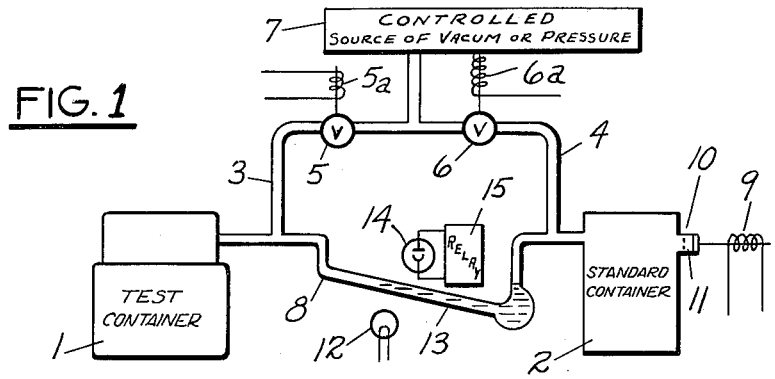
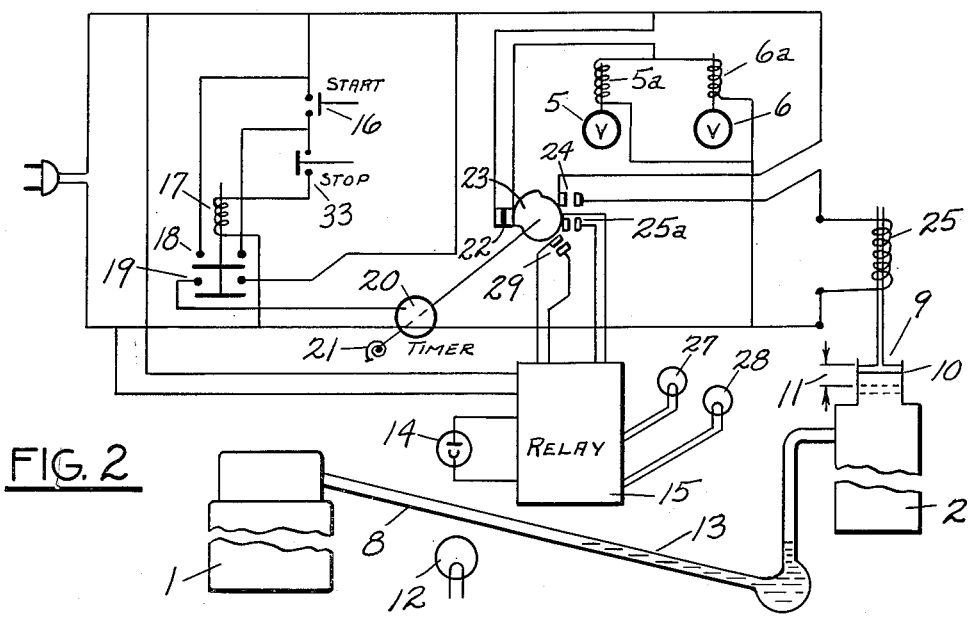
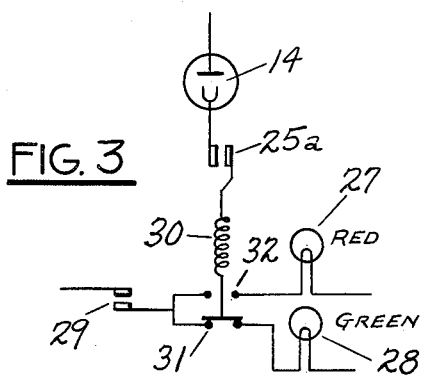

3,028,750
LEAK TESTER
Herbert F. Rondeau, Richboro, Pa., assignor to American Meter Company, Incorporated, Philadelphia, Pa., a corporation of Delaware
Filed July 7, 1958, Ser. No. 746,740
1 Claim. (Cl. 73—49.2)

This invention is a testing device for quantitatively determining the presence of leaks in the order of $\frac{1}{100}$ cubic foot per hour to $\frac{1}{10,000}$ cubic foot per hour or smaller. Leak flow rates of this small magnitude are difficult to measure with conventional testing instruments. One use of the equipment is in the measure of leakage through the valves of gas meters. Another use is in testing gaskets. The equipment is adapted for test under either pressure or vacuum conditions.

In a preferred form of the equipment, a container to be tested for leakage is connected to a source of pressure or vacuum and to a leak proof standard container, which has in one wall a cylinder and piston. After time has been allowed for both containers to assume the same pressure conditions, the source of pressure is cut off and the piston is moved in the cylinder a controlled distance to simulate a leak of predetermined size. When the container is tested under vacuum, the piston is moved inward to simulate the rise in pressure which would accompany a leak of the size equal to the piston displacement. When the test container is tested under pressure, the piston is moved outward to simulate the drop in pressure accompanying a leak of the size of the piston displacement. Between the standard and test containers is a differential pressure gage which measures the difference in pressure between the standard and test containers. After the displacement of the piston, the pressure in the standard container is different from the pressure in the test container by reason of the simulated leak corresponding to the piston displacement. However, if there is a leak in the test container, its pressure will change with time and at the end of the selected test interval a comparison of the pressure in the two containers will indicate whether the leak in the test container is equal to, less than, or greater than the simulated leak caused by the piston displacement in the standard container.

It is not necessary that the test and standard containers be of the same size. The measurement is by comparison of the effect of the simulated leak on the pressure condition in the standard container with the effect of an actual leak on the pressure conditions in the test container. This can be done in a matter of seconds thereby adapting the equipment to production line measurement. The speed of the determination is important because it eliminates the effect of variation in temperature and pressure which would be important if the test required a long period of time.

In the accompanying drawing, FIG. 1 is a diagrammatic view of the test equipment; FIG. 2 is a circuit diagram, and FIG. 3 is a digarammatic view of the photoelectric relay used in FIG. 2.

The tester works upon the principle of comparing the leak in an unknown test container 1 with the simulated or controlled leak in a standard leak proof container 2. At the start of the measurement, both containers are connected through lines 3 and 4 and valves 5 and 6 to a controlled source 7 of vacuum or pressure. When the equipment is used for the testing of gas meters, the source 7 will provide a controlled vacuum. When the equipment is to be used for testing gaskets, the source 7 will provide pressure. On the downstream side of the valves 5 and 6 the containers 1 and 2 are connected to a differential pressure measuring device such as a draft gage 8. When the valves 5 and 6 are open, pressure in the containers 1 and 2 will come to the same value in a few seconds. When this condition has been reached, the valves 5 and 6 are closed and simultaneously the effect of a simulated leak is introduced into the standard container 2 by moving a piston 9 in the cylinder 10 through a distance 11. This movement produces a displacement which can be accurately known because of the known dimensions of the piston and cylinder and of the piston travel. The effect of the displacement of the piston 9 produces a change in the volume of the standard container equivalent to a leak size corresponding to the piston displacement. This simulated leak produced by the piston displacement alters the equality of the pressure conditions in the test and standard containers 1 and 2 and produces a change in the differential pressure indication of the draft gage 8. If there were no leak at all in the test container 1, the differential pressure indication of the draft gage 8 would not change. In the presence of a leak in the test container 1, the differential pressure indication of the draft gage 8 will gradually change with time depending upon the magnitude of the leak. At the time when the draft gage 8 returns to the position of equal pressure conditions on both sides, the actual leak in the test container 1 will be precisely equal to the simulated leak in the standard container 2 caused by the displacement of the piston 9 in the cylinder 10. Or stated another way, if at the end of a time interval the indication of the draft gage 8 has not returned to the position corresponding to equal pressure conditions in both containers, the leak in the test container 1 is less than the simulated leak in the standard container 2 and if at that interval the indication of the draft gage has gone past the indication for equal pressure conditions, the actual leak in the test container 1 is greater than the simulated leak in the test container 2.

Actual measurement of the magnitude of the leak in the test container 1 can be made by measuring the time required for the indication of the draft gage 8 to return to its reading for equal pressure conditions in both containers. Determination of whether the leak in the test container 1 is greater or less than the simulated leak in the standard container can be made by comparing the actual reading of the differential pressure gage 8 at the end of a standard time interval with the reading it would have had under equal pressure conditions for both containers. An arrangement for making this latter measurement which is useful in production testing of gas meters under vacuum conditions comprises a light source 12 focused through the column 13 of the draft gage 8 on a photoelectric cell 14 associated with a relay 15. When the vacuum conditions in both containers are equal, the column 13 is below the beam from the light source 12 which impinges on the photoelectric cell 14. After the simulated leak has been introduced into the standard container 2, the column 13 rises and interrupts the beam. When the leak in the test container 1 is less than the simulated leak, the column 13 will still interrupt the light beam at the end of the test interval and no light will get through to the photoelectric cell 14. On the other hand, if the leak in the test container is equal to or greater than the simulated leak, the column 13 will drop below the light source 12 and the light will impinge upon the photoelectric cell 14. The relay 15 actuated in response to the photoelectric cell 14 determines whether the test container has less or more leakage than the simulated leak in accordance with the information derived from the photoelectric cell 14.

FIG. 2 shows the electric circuit for use with the leak tester. The equipment is put in operation by pushing the start button 16 closing a circuit to a solenoid relay 17 which closes normally open contacts 18 and 19. Contacts 18 are hold contacts for the start button. Contacts 19 are in circuit with a resetting timer 20 which when de-energized is returned to the position illustrated by the coil spring 21. In this position a cam 23 on the timer closes contacts 22 in circuit with solenoids 5a and 6a and opens the valves 5 and 6 thereby connecting the source 7 to the test and standard containers 1 and 2. The timer 20 drives the cam 23 in a clockwise direction as viewed in FIG. 2 and after a short interval (e.g. ten seconds) the contacts 22 open, thereby de-energizing the solenoids 5a and 6a and closing the valves 5 and 6. The ten second interval is long enough for pressure equalization in the test and standard containers. At the same time that the contacts 22 open, contacts 24 are closed, thereby energizing a solenoid 25 which actuates the piston 9 to move it in the cylinder 10 the distance 11. This produces a definite displacement in the standard container 2 simulating the leak and causes the liquid column 13 in the draft gage 8 to rise and interrupt the beam from light source 12. At the end of the test interval (e.g. twenty seconds) contacts 25a are closed, thereby connecting relay 15 to ascertain from the photoelectric cell whether the beam from light source 12 is still interrupted by the column 13. This information is shortly thereafter transmitted to red or green signal lights 27 or 28 by the closing of contacts 29. If the leak in the test container 1 is less than the simulated leak in the standard 2, the column 13 will still interrupt the beam from light 12 at the closing of contacts 25a and upon closing of contacts 29, the green signal light 28 will be illuminated indicating a leak of less than the simulated leak. If the leak in the test container 1 is greater than the simulated leak, the column 13 will have dropped below the light source 12 at the closing of contacts 25a and upon closing of contacts 29 the red signal light 27 will be illuminated. The photoelectric relay 15 is a well known device which is commercially available and may consist of the simple form illustrated in FIG. 3. Upon closing of contacts 25a the relay 15 is actuated to one of two positions depending upon whether light from source 12 impinges or does not impinge on photoelectric cell 14. This is accomplished by relay 30 which de-energized closes contacts 31 in series with green light 28 and when energized closes contacts 32 in series with red light 27. Upon closing of contacts 29, this information is revealed by energizing either the red or green light 27 or 28.

After noting the test information, the test is stopped by pushing the stop button 33 opening the circuit to relay 17 and de-energizing the timer 20 which is quickly reset by its resetting spring 21.

The test equipment is ideal for production line measurement of leakage where the information desired is ordinarily whether a leak is less than or greater than a selected standard. Since the information is derived by comparing the test and standard containers, many of the factors which affect measurement are completely compensated. For example, the test and standard containers are subjected to the same ambient conditions of barometric pressure and atmospheric temperature. The test requires such a short interval that changes in these ambient conditions need not be compensated for. The equipment is very quickly adjusted to new conditions. The time interval for testing is adjustable by changing the time of closing of contacts 25a which is easily and quickly done in commercial timers. The longer the timer interval between the closing of contacts 24 and 25a, the slower the leak. It is also possible to vary the magnitude of the simulated leak either by changing the size of the piston and cylinder 9 and 10 or by changing the distance of travel. In the particular equipment where the differential pressure measuring device consists of the draft gage 8, the operator has visual evidence from the height of the column 13 as to whether the equipment is operating. At the start of the test, the column 13 rises to a position corresponding to equal pressure conditions in both test and standard containers. Upon the introduction of the simulated leak in the standard container, the column 13 shifts in position by a definite and controlled amount caused by the change in pressure conditions in the standard container resulting from the simulated leak. At the end of the test interval, the position of the column 13 is visually apparent to the operator at the same time that it is observed by the photoelectric cell 14. The position of the photoelectric cell 14 and of the light source 12 can be easily varied to accommodate different pressure conditions.

Where quantitative measurement of the leak in the test container is desired, the time required for the column 13 to return to the initial position after the introduction of the simulated leak would provide an accurate measurement of the rate of leakage provided the magnitude of the simulated leak and the volume of the test and standard containers were known.

The measurement of leakage is based upon comparing the change in the pressure (or vacuum) conditions in the test container with the change in the corresponding condition in the leak proof standard container. The change in the standard container simulates a leak of accurately measurable size. The time required for the test container to reach a corresponding condition is accordingly an accurate measurement of the rate of leakage in the test container. This eliminates any need for measurement of the actual pressure and temperature conditions because all measurements are by comparison of the known simulated leak in the standard container with the actual leak (if any) in the test container.

What is claimed as new is:

The method for appraising the rate of leakage in a test container by comparison with a standard leak proof container which comprises establishing equal pressure conditions in both the standard and test containers, sealing the containers to retain the established pressure conditions except as modified by leakage, varying the volume of the standard container a controlled amount to vary the pressure conditions in the standard container by an amount corresponding to a leak of known size, measuring the differential pressure in the two containers, and measuring the interval required for equalization of the pressure conditions in the containers after the differential caused by the simulated leak in the standard container.

References Cited in the file of this patent

UNITED STATES PATENTS

| 1,720,934 | Toleik | July 16, 1929 |
| 1,944,637 | Emanueli | Jan. 23, 1934 |
| 2,467,767 | Mertler | Apr. 19, 1949 |
| 2,687,272 | Schieser | Aug. 24, 1954 |
| 2,855,777 | Garrett | Oct. 14, 1958 |
| 2,872,806 | Mamzic | Feb. 10, 1959 |
| 2,924,965 | Westerheim | Feb. 16, 1960 |

FOREIGN PATENTS

| 1,114,506 | France | Dec. 19, 1944 |
| 791,043 | Great Britain | Feb. 19, 1958 |